United States Patent [19]

McGinniss

[11] 4,029,561
[45] June 14, 1977

[54] PHOTOCURABLE CATHODIC ELECTROCOATING

[75] Inventor: Vincent Daniel McGinniss, Valley City, Ohio

[73] Assignee: SCM Corporation, New York, N.Y.

[22] Filed: Jan. 22, 1976

[21] Appl. No.: 651,541

[52] U.S. Cl. .............................................. 204/181
[51] Int. Cl.² ................. C25D 13/06; C25D 13/10
[58] Field of Search .................................... 204/181

[56] References Cited

UNITED STATES PATENTS

| | | | |
|---|---|---|---|
| 3,875,067 | 4/1975 | DeSargo et al. | 250/527 |
| 3,925,181 | 12/1975 | McGinniss | 204/181 |
| 3,954,587 | 4/1976 | Kokawa | 204/181 |

*Primary Examiner*—Howard S. Williams
*Attorney, Agent, or Firm*—Jerry K. Mueller, Jr.

[57] ABSTRACT

An electrocoating composition containing a polymer having pendant amine groups, a bis-maleimide crosslinking agent and an ultraviolet photosensitizer can be electrodeposited onto a cathode substrate disposed within an aqueous electrocoating bath. The amine groups of the polymer are protonated to render the polymer water dispersible prior to electrodeposition. Upon electrodeposition, the amine groups become de-protonated. The bis-maleimide crosslinks the polymer upon ultraviolet irradiation of the electrocoated cathode substrate to form a fully cured electrodeposited coating on the cathode substrate.

2 Claims, No Drawings

PHOTOCURABLE CATHODIC ELECTROCOATING

BACKGROUND OF THE INVENTION

This invention relates to electrodeposition of water-dispersed polymers onto a cathode substrate and more particularly to crosslinking said electrodeposited polymers with bis-maleimide.

U.S. Pat. No. 3,925,181 of applicant, Vicent D. McGinniss, describes an electrocoating composition of a polymer having pendant amine groups and a bis-maleimide crosslinking agent. The electrocoating composition is electrodeposited onto a cathode substrate and heat cured. The disclosure of said patent is incorporated expressly herein by reference.

The present invention is directed to an electrocoating process which utilizes the bis-maleimide crosslinking agent for curing a polymer which has been electrodeposited onto a cathode substrate, but where the bis-maleimide crosslinks the polymer upon ultravoilet irradiation of the electrocoated cathode substrate.

SUMMARY OF THE INVENTION

The instant improvement in process for electrodeposition of an electrocoating composition onto a cathode substrate disposed within an aqueous electrocoating bath, said electrocoating composition containing a polymer having pendant amine groups which are protonated with a proton donating acid and a crosslinking agent in an aqueous dispersion in said bath, said polymer being crosslinkable upon subsequent ultraviolet irradiation of said elctrocoating on said cathode substrate, comprises:

a. providing said electrocoating composition containing said polymer having at least about 5% pendant amine groups, each said amine group being attached to an alpha carbon relative to each said amine group of said polymer, said amine groups being protonated with said proton donating acid to render said polymer water dispersible in said bath, said electrocoating composition containing at least about 5% bis-maleimide crosslinking agent by weight of said polymer, and said electrocoating composition containing at least about 0.5% by weight of said polymer of an ultraviolet photosensitizer;

b. applying an electromotive potential through said bath to electrodeposit said polymer, said crosslinking agent, and said photosensitizer onto said cathode substrate to form said electrocoating, said pendant amine groups of said polymer becoming de-protonated thereby; and c. irradiating said electrocoating on said cathode substrate with ultraviolet radiation to crosslink said polymer with said bis-maleimide by free radical addition polymerization with said alpha carbon to cure said electrocoating.

DETAILED DESCRIPTION OF THE INVENTION

The electrocoating composition contains a polymer or resin selected according to final desired use from a wide variety of known polymers in the electrocoating art.

The polymers contain pendant amine groups. The amine groups can be primary, secondary, or tertiary for present purposes. By protonating such amine groups, the polymer can be water dispersed. Electrodeposition of the polymer de-protonates the amine groups. Amine groups can be attached to the polymer by reacting free carboxyl groups on a polymer (polyester, acrylic, urethane, etc.) containing available carboxyl groups which can be reacted with alkyleneimine or substituted alkyleneimine, as proposed in U.S. Pat. Nos. 3,679,564 and 3,617,458, and incorporated herein by reference. Similarly, amine groups can be introduced into the polymer by reacting pendant carboxylic acid groups on a polymer with ethylene imine or derivatives of ethylene imine. Difunctional amines also can be reacted with reactive pendant carboxyl groups on the polymer.

Blocked amines also can be attached to the polymer and, if desired, subsequently transformed into primary amine groups by an appropriate reaction which will be outlined in detail later herein. Such blocked amine groups can be attached to epoxy resins or acrylic resins having pendant oxirane groups by reacting a ketimine blocked diethylene triamine, formed from reacting diethylene triamine with an excess of methyl ethyl ketone, with the polymer. Such a reaction can be illustrated as follows:

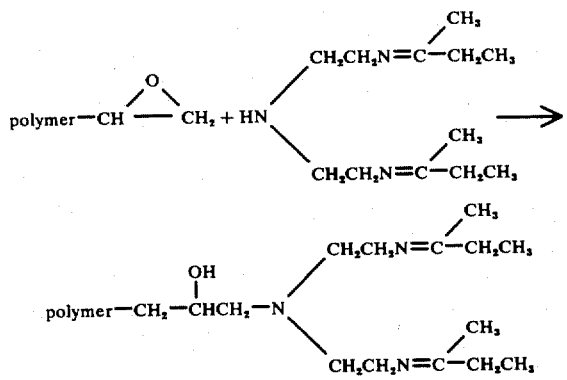

Similar blocked dialkyltriamines also can be employed to attach the blocked amine groups as above set forth.

The amine groups are pendantly attached to the polymer. For purposes of this application, pendant amine groups include terminal amine groups. By pendantly attached is meant that such amine groups are attached to the polymer chain or to a pendant side chain of the polymer.

The polymer containing pendant amine groups should contain at least about 5% by weight of such pendant amine groups, and up to about 50% if desired.

Representative polymers containing pendant amine groups can be derived from epoxy and epoxy-modified diglycidyl ethers of bis-phenol A structures, various aliphatic polyethylene or polypropylene glycol (diglycidyl ether) adducts, and glycidyl ethers of phenolic resins, such epoxy resins being commercially available and commonly used in the electrocoating field.

Other useful polymers containing pendant amine groups include polyamide resins, for example, condensation products of dimerized fatty acids coreacted with difunctional amine, such as ethylene diamine. Polyamide resins generally are between about 500 and about 5,000 molecular weight. Further useful electrocoating polymers containing pendant amine groups include acrylic resins having molecular weight of about 1,000 to about 100,000, polyester resins and polyurethane resins both having a molecular weight range of about 500 to about 5,000, vinyl resins, and amine resins.

Various other useful electrocoating polymers containing pendant amine groups can be advantageously employed in the composition of this application as will be apparent to those skilled in the art.

The crosslinking agent is a bis-maleimide having alpha-, beta-ethylenic unsaturation capable of being reactive to crosslink the polymer under the influence of ultravoilet irradiation.

Bis-maleimides are represented by the following general structure:

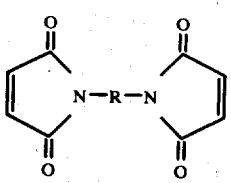

where R is alkyl, aryl, alkyl-aryl, or polymers having a molecular weight up to about 3,000.

Alkylene, aryl-bis-maleimides and combinations thereof are particularly useful as the crosslinking agent of this invention. Specific bis-maleimides which are particularly suited to the precepts of this invention can be selected from the group consisting of dimethylenedimaleimide, trimethylenedimaleimide, tetramethylenedimaleimide, pentamethylenedimaleimide, hexamethylenedimaleimide, heptamethylenedimaleimide, decamethylenedimaleimide, 4,4'-methylene-bis (orthochloroaniline), 4,4'-methylene-dianiline, 4,4'-methylene-bis (3-nitroaniline), 4-aminophenylether, N,N'-orthophenylenedimaleimide, N,N'-paraphenylenedimaleimide, and N,N-methaphenylenedimaleimide.

Bis-maleimides can be synthesized by various methods such as is disclosed in U.S. Pat. No. 2,444,536, and the same is incorporated expressly herein by reference. Generally, a diluted ether solution of diamine is added to a similar diluted ether solution of maleic anhydride which results in a maleamic acid. The maleamic acid can be disposed in acetic anhydride and converted into the corresponding bis-maleimide in the presence of potassium acetate.

The bis-maleimide crosslinks the polymer upon irradiation of the electrocoated cathode substrate with ultravoilet radiation in the presence of a photosensitizer. The reaction mechanism is a free radical addition polymerization involving the linking of the unsaturation of the bis-maleimide with the alpha carbon of the pendant amine groups of the polymer. By alpha carbon of the pendant amine groups is meant the carbon in the alpha position relative to the amine group and to which the pendant amine group is attached.

The UV sensitizers are combined with the electrocoating composition and are adapted to be simultaneously co-deposited with the composition onto the cathode substrate during the electrodeposition process. The UV sensitizers are added to the electrocoating composition in amounts of at least about 0.5% and preferably between about 1 and 5% by weight of the polymer.

Useful UV sensitizers of photosensitizers include halogenated polynuclear ketones as disclosed in copending Ser. No. 480,738 filed on June 19, 1974 and U.S. Pat. No. 3,827,957, the same incorporated expressly herein by reference. Other suitable UV sensitizers include organic carbonyl compounds selected from alkylphenones, benzophenones, and tricyclic fused ring compounds as disclosed in U.S. Pat. No. 3,759,807 and incorporated expressly herein by reference. Further useful UV sensitizers include carbonylated phenyl nuclear sulfonyl chlorides such as set forth in U.S. Pat. No. 3,827,959, and expressly incorporated herein by reference. Additional useful photosensitizer combinations particularly suitable for pigmented coatings are a combination of sensitizers comprising aromatic carbonyl compounds, aromatic aldehydes or aromatic ketones, and a synergistic sensitizer of about 0.05 to 31% of 2,2'-dithiobis-(benzothiazole) as more particularly set forth in U.S. Pat. No. 3,847,771 and expressly incorporated herein by reference.

At least about 0.5% by weight of ultraviolet sensitizer and preferably about 1 to 5% sensitizer is added to the polymer and thoroughly mixed or otherwise dispersed in the polymer phase prior to solubilizing the polymer in an aqueous solution.

In practicing this invention, the polymer is rendered water dispersible by adding sufficient acid to the polymer to completely neutralize the polymer. Appropriate acids are, for example, proton-donating acids such as phosphoric, sulfuric, hydrochloric, acetic, formic, lactic, and other proton-donating organic and inorganic acids. Water solubility is achieved by the protonating of all amine groups of the polymer by the acid. The protonating of the amine groups of the polymer also renders the polymer positively charged so that during electrodeposition the polymer can migrate to the cathode substrate and be deposited thereon.

The neutralized polymer and UV sensitizer are blended with at least about 51% bis-maleimide crosslinking agent by weight of the polymer and up to about 25% if desired. The blend is then dispersed in water to form the electrocoating bath of from about 5 to about 20% non-volatile dispersion. The bath is generally at about 50° to about 125° F., with about 70° to about 95° F. being preferred.

The neutralized (protonated) polymer and bis-maleimide are both stable in the bath. The cathode substrate to be electrocoated then is immersed in the electrocoating bath while an electric potential is maintained therethrough as disclosed in U.S. Pat. No. 3,619,398, the same being incorporated herein by reference. During electrodeposition the positively charged polymer along with the bis-maleimide and the UV sensitizer migrate to the cathode substrate. The protonated amine groups of the polymer become de-protonated (lose protons) due to the electric potential applied. The polymer, the bis-maleimide, and the UV sensitizer are codeposited on the cathode substrate. The electric potential applied to the bath is generally between about 20 and about 500 volts, with about 50 to about 300 volts being preferred.

The coated substrate is removed from the bath and washed with water to remove excess coating. The electrodeposited coating on the cathode substrate is cured with ultraviolet (UV) sensitizer or photosensitizer.

Typical sources of ultraviolet energy ordinarily produce wavelengths in the ultraviolet spectrum that are transmitted through a quartz and such wavelengths are usually between about 1,000 and 4,000 A. Suitable ultraviolet emitters include various electric arc lamps, plasma arc torch, such as described in U.S. Pat. No. 3,364,487, and lasers having a lasing output in the ultraviolet spectrum as disclosed in copending U.S. Ser. No. 189,254 (filed on Oct. 14, 1971 and now abandoned), the disclosures of said references are incorporated expressly herein by reference. Other suitable sources of actinic light include quartz mercury lamps, ultraviolet quartz lamps, and high flash lamps. Details of ultraviolet radiation curing the instant electrocoating composition can be as practiced in copending U.S. Ser. No. 480,738, the disclosure of which is incorporated expressly herein by reference.

The cathode substrate is an electrically conductive metal such as iron, steel, aluminum, copper, galvanized steel, zinc, and the like. The cathode substrate can be in the shape of bars, sheets, irregularly shaped forms with rounded or sharp edges, and like shapes.

The electrocoating composition can contain opacifying pigments and inert extenders such as, for example, titanium dioxide, zinc oxide, clays such as kaolinite clays, silica, talc, and the like.

The following examples show how the instant invention can be practiced, but should not be construed as limiting the invention. In the specification all parts are parts by weight, all percentages are weight percentages, and all temperatures are in degrees Fahrenheit, unless otherwise expressly indicated.

EXAMPLE 1

A solution acrylic polymer was conventionally prepared by reacting methyl methacrylate (290 parts per weight, ppw), ethyl acrylate (230 ppw), butyl methacrylate (320 ppw), 2-hydroxyethylacrylate (20 ppw), and diethylaminoethylmethacrylate (140 ppw) in butyl cellosolve solvent (500 ppw) for six hours in the presence of benzoyl peroxide and VAZO 64 catalysts.

The resulting acrylic polymer having pendant amine groups was blended with 51% of 2-chlorothioxanthone photosensitizer and 201% of hexamethylenedimaleimide cross-linking agent. The blend was neutralized with acetic acid and dispersed in deionized water to form a 10% non-volatile electrocoating bath.

The resulting electrocoating composition was cathodically electrodeposited onto a steel panel at 100 volts for 30 to 60 seconds, removed from the bath, and washed with water. The electrocoated panel, then, was covered with a thin polyethylene sheet, placed under an 800 watt medium pressure mercury lamp (ultraviolet radiation source), and irradiated for 30 minutes. A hard, flexible, solvent-resistant coating covered the panel.

EXAMPLE 2

One mole of an epoxy resin (DER 664, epoxy equivalent weight of 900, Dow Epoxy Resin, Dow Chemical Company) was reacted at 60° C. with two moles of a ketimine blocked diethylene triamine represented by the following structure:

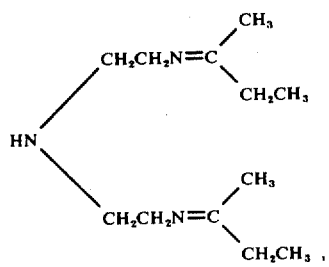

completely neutralized with 4 moles of lactic acid, and blended with 20% N,N'-para-phenylenedimaleimide cross-linking agent and 10% benzophenone photosensitizer. The blend was added to butyl cellosolve and deionized water to form a 7% non-volatile (solids) dispersion.

This electrocoating composition was cathodically electrodeposited at 100 volts for 1 minute onto a steel panel, removed from the bath, and washed with water.

The coating then was heated at 200° F. for 10 minutes to flow-out the coating. Some cure of the coating resulted due to the pendant amine groups of the polymer linking with the crosslinking agent.

Full cure of the coating was obtained by placing a thin film of polyethylene over the coated panel and irradiating the coated panel for 20 minutes under an 800 watt medium pressure mercury lamp.

EXAMPLE 3

The cathodic electrocoating compositions of Examples 1 and 2 each were prepared again, except that the ultraviolet photosensitizer system used for each was 1% Michler's ketone, 51% benzophenone, and 3% 2,2'-dithiobis benzothiazole.

Each composition was cathodically electrocoated and cured by exposure to ultraviolet irradiation in the same manner as described in Examples 1 and 2 above. A fully cured, hard, flexible, solvent-resistant coating resulted upon curing.

I claim:
1. In a process for electrodeposition of an electrocoating composition onto a cathode substrate disposed within an aqueous electrocoating bath, said electrocoating composition containing a polymer having pendant amine groups which are protonated with a proton donating acid and a crosslinking agent in an aqueous dispersion in said bath, said polymer being crosslinkable upon subsequent ultraviolet irradiation of said electrocoating on said cathode substrate, the improvement which comprises:
   a. providing said electrocoating composition containing said polymer having at least about 5% pendant amine groups each amine group being attached to an alpha carbon relative to each said amine group of said polymer, said amine groups being protonated with said proton donating acid to render said polymer water dispersible in said bath, said electrocoating composition containing at least about 5% bis-maleimide crosslinking agent by weight of said polymer, and said electrocoating composition containing at least about 0.5% by weight of said polymer of an ultraviolet photosensitizer;
   b. applying an electromotive potential through said bath to electrodeposit said polymer, said crosslinking agent, and said photosensitizer onto said cathode substrate to form an electrocoating, said pendant amine groups of said polymer becoming deprotonated thereby; and
   c. irradiating said electrocoating on said cathode substrate with ultraviolet radiation to crosslink said polymer with said bis-maleimide by free radical addition polymerization with said alpha carbon to cure said electrocoating.

2. The elctrodeposition process of claim 1 wherein said bis-maleimide is represented by the formula:

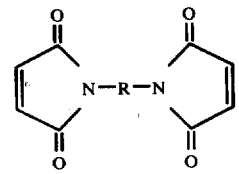

where R is alkyl, aryl, alkyl-aryl, or polymers having a molecular weight up to about 3,000.

* * * * *